United States Patent [19]
Natalie et al.

[11] Patent Number: 4,846,898
[45] Date of Patent: Jul. 11, 1989

[54] METHOD OF RENDERING ALUMINUM BASE METAL RESISTANT TO WATER STAINING

[75] Inventors: Charles A. Natalie, Arvada; Julianne Bates, Lakewood, both of Colo.; Mark S. Vukasovich, Ann Arbor, Mich.

[73] Assignee: AMAX Inc., New York, N.Y.

[21] Appl. No.: 190,321

[22] Filed: May 5, 1988

[51] Int. Cl.$^4$ ............................................. C23C 22/40
[52] U.S. Cl. .................................. 428/469; 106/14.21; 106/14.39; 106/14.05; 148/251; 148/273; 148/275
[58] Field of Search ........................ 428/469; 148/6.27; 106/14.21, 14.39, 14.05

[56] References Cited
U.S. PATENT DOCUMENTS 3,945,899  3/1976  Nikaido ................................ 428/469
4,298,657  11/1981 Orellion ............................... 428/469
4,756,772  7/1988  Gazapo ................................ 148/6.27

Primary Examiner—Sam Silverberg
Attorney, Agent, or Firm—Michael A. Ciomek; Richard J. Minnich; James W. McKee

[57] ABSTRACT

A method of rendering an aluminum base metal surface resistant to water staining is provided which comprises providing an aluminum base metal surface and applying a stain resistant coating to the aluminum base metal surface, with the stain resistant coating containing a water soluble molybdate salt and water soluble nitrite compound in an amount sufficient to render the aluminum base metal surface resistant to water staining. An aluminum base metal article of manufacture which is resistant to water staining is also provided.

21 Claims, No Drawings

METHOD OF RENDERING ALUMINUM BASE METAL RESISTANT TO WATER STAINING

BACKGROUND OF THE INVENTION

The present invention relates to a method of treating an aluminum base metal to render it resistant to the corrosion or self anodization mechanism known in the art as water staining. More particularly, it concerns a method of rendering an aluminum base metal resistant to water staining by applying to the surface of the metal a coating which contains an effective amount of a water soluble molybdate salt, preferably sodium molybdate and a water soluble nitrite compound, preferably sodium nitrite.

As used herein the term "aluminum base metal" includes pure aluminum, as well as alloys of aluminum which contain at least fifty weight percent of aluminum. Typical of such alloys are manganese and magnesium alloys of aluminum.

Aluminum and its alloys, i.e., aluminum base metals, are frequently considered to be extremely corrosion resistant. This is attributed to the compact, adherent oxide film which forms on the metal surface. However, aluminum metal can easily experience the water staining form of corrosion or self anodization during shipment and storage. This is due to the ingress of water between coils or sheets of the metal from rain, humidity or temperature fluctuations past the ambient dew point. This water in crevices between aluminum surfaces can provide the conditions for a differential aeration cell. This differential aeration cell consists of regions into which oxygen can readily diffuse, like coil or sheet edges, and regions into which diffusion of oxygen is very limited, like the areas in from the edges of the metal. The oxygen poor region functions as the anode and the oxygen rich region becomes the cathode. Corrosion (i.e., self anodization) can occur in the anodic area, and under these conditions, the water staining form of aluminum corrosion results. Water staining requires nothing more than the presence of water and crevices to form the differential aeration condition. This staining can occur on commercially pure aluminum and all its alloys.

In some case, staining is detrimental by virtue of its unsightliness alone. It can be brownish black, gray or whitish, and can roughen the surface significantly. Staining can also effect mechanical properties of the metal, ease of forming and weldability. Because of these problems, there is great interest in preventing water staining on aluminum.

To date, many types of surface treatments have been tested in attempts to overcome water staining of aluminum. One compound which has been tried for aluminum and other metals is sodium molybdate. However, the use of sodium molybdate by itself on aluminum does not result in satisfactory water staining inhibition.

From the foregoing, it is clear that water staining of aluminum is highly undesirable, and that while numerous techniques have been tried to obviate this problem, no solution has heretofore been advanced which is simple, effective and economical.

Accordingly, the principal object of the present invention is to provide a simple, effective and economical means of rendering aluminum base metal resistant to water staining.

The foregoing and other objects of the instant invention will become apparent to those skilled in the art from a reading of the following specification and claims.

SUMMARY OF THE INVENTION

In one aspect, the present invention concerns a method of rendering an aluminum base metal surface resistant to water staining wherein the method comprises providing an aluminum base metal surface and applying a stain resistant coating to the aluminum base metal surface, the stain resistant coating containing a water soluble molybdate salt, preferably sodium molybdate, and a water soluble nitrite compound, preferably sodium nitrite, in an amount sufficient to render the aluminum base metal surface resistant to water staining.

In another aspect, the instant invention relates to an article of manufacture comprising an aluminum base metal surface which is resistant to water staining, the surface having a coating thereon which includes a water soluble molybdate salt, preferably sodium molybdate, and a water soluble nitrite compound, preferably sodium nitrite, in an amount sufficient to render the aluminum base metal surface resistant to water staining.

DETAILED DESCRIPTION OF THE PREFERRED PRACTICE OF THE INVENTION

The corrosion process by which water staining (i.e., self anodization) of aluminum occurs is electrochemical in nature. It requires an electrolyte, a cathodic region (regions into which oxygen can readily diffuse), and an anodic area (regions which experience little oxygen diffusion). To inhibit or prevent corrosion from occurring, it is required that this electrochemical cell be interrupted in some manner. This has been accomplished via the instant invention by use of a coating on the aluminum base metal surface which contains both a water soluble molybdate salt, preferably sodium molybdate, and a water soluble nitrite compound, preferably sodium nitrite.

In order to reasonably duplicate the problems frequently experienced in the aluminum industry with respect to water staining, two common alloys were chosen for evaluation: 3003, an aluminum-manganese alloy, and 5052, an aluminum-magnesium alloy. Throughout the course of this investigation, identical tests were performed on both alloys in the event that significantly different corrosion behavioral characteristics were exhibited as a function of major alloying elements. The experimental procedure was broken down into three divisions, the first being the analysis and reaction of the water staining problem, second the characterization of sodium molybdate behavior as an inhibitor, and finally, the determination of the combined effect of sodium molybdate with sodium nitrite.

Duplicating Water Staining on 3003 and 5052 Aluminum

Staining on aluminum sheets and coils is brought about by the presence of water between an aluminum surface and any other surface. To recreate these conditions required two things: aluminum surfaces in close contact with other surfaces and the presence of water between these surfaces. To provide the 'crevices' on the metal surfaces, a test piece configuration was developed which consists of a stack of three sheets of aluminum alloy sandwiched between two sheets of cardboard which, in turn, are sandwiched between two Plexiglass holders. This design allows a sufficient contact area that assures both stagnant areas into which oxygen diffusion is difficult, and other areas into which oxygen is able to readily diffuse. It also allows the investigation to include an analysis of staining when aluminum surfaces contact other aluminum surfaces, as in the case of coiled aluminum with no liners, and staining when aluminum surfaces contact packing material, as when the metal is coiled or stacked with protective cardboard or paper liners. The test pieces are held together to provide maximum and continual contact for the duration of the test.

To provide the ingress of water to the aluminum surfaces, the test pieces were placed, electrically isolated from one another and their surroundings, in glass dishes in a Model 434304 Hotpack Temperature-Humidity Chamber under constant temperature (32 degrees Centigrade), and at 100 percent humidity. Initially, tests were run to determine the time before staining became observable and the time until the staining did not visibly appear to worsen. These time values were used to establish test durations for subsequent tests.

In this initial testing, the aluminum surfaces were not treated in any way other than by means of a surface polishing with Scotch-Brite to remove cosmetic scratches and burrs. Sufficient time was allowed after this polishing to re-establish the equilibrium aluminum oxide film on the metal surface. Afterwards, the test pieces were washed with soap to remove surface dirt and polish residue, degreased in an ultrasonic acetone bath, rinsed with distilled water, and fully dried. Throughout this investigation, all test pieces were polished and cleaned in this manner. Separate tests were performed, each for a duration of 5, 10, 15 and 20 days and the results given in Table I.

By way of background, test results present herein in tabular form are based on a minimum of three series of tests in each case to assure the reproducibility and validity of the reported observations.

TABLE I

| WATER STAINING ON ALUMINUM SURFACES | | | | | |
|---|---|---|---|---|---|
| | Exposure Time (Days) | | | | |
| Alloy | 2 | 5 | 10 | 15 | 20 |
| 3003 | 1 | 1 | 1-2 | 2 | 2 |
| 5052 | 1 | 1 | 1-2 | 2 | 2 |

No Visible Staining - 0
Mild Staining - 1
Severe Staining - 2

Production of Water Staining on 3003 and 5052 Aluminum Surfaces

To determine the conditions under which water staining of aluminum would take place on untreated metal surfaces, separate tests were run to assure that the conditions bringing about the staining were predictable and repeatable. Table I lists the test results as a function of alloy and exposure time.

Tests indicated that at 32 degrees centigrade and at 100 percent humidity, with the water at pH values ranging between 5.6 and 6, noticeable staining of both the 3003 and 5052 aluminum surfaces was observed within a time period of 2 days. In virtually all cases, it was also observed that the staining was more immediate and more severe on the aluminum surfaces in contact with cardboard than on the metal-metal contact surface. This can be explained because the contact of the damp cardboard to the aluminum surface is more intimate and more complete and because salts contained in the cardboard can leach out, enhancing the conductivity of the electrolyte on the metal surface and increasing the corrosion or staining rate.

As the results in Table I show, fairly severe staining appeared on all test pieces between 5 and 10 days. After 10 days, staining was quite severe, and could upon occasion, join two pieces of aluminum such that they had to be mechanically separated. Again, staining on the cardboard-metal interface more completely covered the aluminum surface.

It was concluded upon the completion of this series of tests, that test exposure times of 5, 10, 15 and 20 days under conditions of 100 percent humidity and 32 degrees centigrade, would allow water staining to develop and grow significantly, possibly exceeding worst-case conditions that could be experienced in the commercial storage and shipment of aluminum.

The Characterization of Sodium Molybdate Methods to Maintain Sodium Molybdate on the Aluminum Surface For sodium molybdate to function as an inhibitor it must be in contact with corrosion or self anodization processes at the metal surface. It is commercially available in dry powder form and is readily dissolved in water.

It is obvious that in its dry form, sodium molybdate could not break down to release its functional ion which works as an inhibitor. To provide the necessary aqueous environment and to provide adhesion of the inhibitor to the surface being treated, it was decided to use a nontoxic, commercially available binding agent. Two different types were utilized in the initial tests: polyvinyl alcohol and hydroxypropyl methylcellulose. Both of these binders dissolve in distilled water with agitation to prevent agglomeration of the dry powders. They are nontoxic and widely used in a variety of applications. A series of brief tests were run on these two binders to determine the concentrations necessary to achieve adequate viscosity of each. The viscosity of the binder solutions had to be such that the molybdate in the solutions would remain in contact with the aluminum surface in an environment of 100 percent humidity with gravity effects on standing test pieces. The viscosity at the same time could not be excessive so that the test pieces were gummy or unable to make intimate contact with other surfaces. Once the binding solution concentrations were established (values shown in Table II below), a series of tests to determine the effects of the binding solutions on water staining of aluminum had to be run to isolate the effects of sodium molybdate from those of the binder.

TABLE II

| Concentrations of Organic Binders Used on Corrosion Tests | |
|---|---|
| Binder | Optimal Concentration |
| Polyvinyl Alcohol | 4 grams per liter |
| Hydroxypropyl Methylcellulose | 1.5 grams per liter |

Characterization of Sodium Molydbate as a Water Stain Inhibitor

Using the test configuration described before, a series of tests were conducted to determine the degree to which water staining would occur under identical environmental conditions and time periods:

a. on plain aluminum surfaces in contact with each other;

b. on plain aluminum surfaces in contact with packing cardboard;
c. on aluminum surfaces coated with a thin layer of binder (both binder solutions) in contact with other similarly coated aluminum surfaces;
d. on aluminum surfaces coated with a thin layer of both binders in contact with packing cardboard;
e. on aluminum surfaces coated with varying concentrations of sodium molybdate in each of the two binding solutions in contact with similarly coated aluminum surfaces; and
f. on aluminum surfaces coated with varying concentrations of sodium molybdate in each of the two binding solutions in contact with packing cardboard.

It must be noted at this time that distilled water was used to make up all binder solutions. The pH of the distilled water used was 5.6 before and after the addition of both types of binder. Therefore, all tests run in this series of evaluations were run at a naturally occurring pH of 5.6. It must also be noted that the pH of the condensate inside the humidity chamber had a value of 5.6. This acidic pH can be attributed to the presence of dissolved $CO_2$ from the air, and the resulting equilibrium which is established. Results from this test sequence must consequently be assumed to be valid, in part, as a function of the pH of 5.6 in the electrolyte.

All tests were run to determine staining after 5, 10, 15 and 20 days respectively. For the control tests run with and without binder, staining appeared almost always within the first 5 days and was quite severe after 10 and 15 days. There was little difference in every case between the 15 and 20 day test results, and so it was determined that 20 days was a sufficient test duration in which to characterize the effects of test variables.

Once the effects of no binder/no inhibitor, binder/no-inhibitor and binder/inhibitor between adjacent aluminum surfaces and aluminum-cardboard surfaces were determined, the same series of tests were run to define pH effects on those same systems. In summary at this point, Table III lists the constant and the variables being considered in the tests which have been run thus far.

TABLE III

| Test Parameters | |
| --- | --- |
| Constants | Variables |
| Temperature - 32° Celsius | Surface Treatment: |
| Relative Humidity - 100% | No Binder-No Inhibitor |
| Test Piece Size - 3 × 3 × 0.25 inches | Binder-No Inhibitor |
| Test Durations - 5, 10, 15, 20 days | Binder-Inhibitor |
| Alloy Types - 3003, 5052 Al | Inhibitor Concentration |
| | pH |
| | Nature of Surface Contact: |
| | Al—Al |
| | Al-Cardboard |

Further, series of tests were conducted to determine the effect of sodium molybdate on water staining. These results are set forth in Table IV.

TABLE IV

| | | Corrosion Test Results | | | | | |
| --- | --- | --- | --- | --- | --- | --- | --- |
| | | Inhibitor | | Exposure Time, Days | | | |
| Alloy | Binder | mg/cm² | pH | 5 | 10 | 15 | 20 |
| 3003 | P | — | 5.6 | 2 | 2 | 2 | 2 |
| 3003 | M | — | 5.6 | 1 | 2 | 2 | 2 |
| 5052 | P | — | 5.6 | 1 | 2 | 2 | 2 |
| 5052 | M | — | 5.6 | 1 | 2 | 2 | 2 |
| 3003 | P | — | 7.0 | 0 | 0 | 1 | 1 |
| 3003 | M | — | 7.0 | 0 | 0 | 1 | 1 |
| 5052 | P | — | 7.0 | 0 | 0 | 1 | 1 |
| 5052 | M | — | 7.0 | 0 | 0 | 1 | 1 |
| 3003 | P | — | 9.0 | 1 | 1 | 1 | 1 |
| 3003 | M | — | 9.0 | 1 | 1 | 1 | 1 |
| 5052 | P | — | 9.0 | 1 | 1 | 1 | 2 |
| 5052 | M | — | 9.0 | 1 | 1 | 1 | 1 |
| 3003 | P | .005 | 5.6 | 2 | 2 | 2 | 2 |
| 3003 | M | .005 | 5.6 | 2 | 2 | 2 | 2 |
| 5052 | P | .005 | 5.6 | 2 | 2 | 2 | 2 |
| 5052 | M | .005 | 5.6 | 2 | 2 | 2 | 2 |
| 3003 | P | .01 | 5.6 | 1 | 2 | 2 | 2 |
| 3003 | M | .01 | 5.6 | 1 | 1 | 2 | 2 |
| 5052 | P | .01 | 5.6 | 1 | 1 | 2 | 2 |
| 5052 | M | .01 | 5.6 | 1 | 2 | 2 | 2 |
| 3003 | P | .01 | 7.0 | 1 | 1 | 1 | 1 |
| 3003 | M | .01 | 7.0 | 1 | 1 | 1 | 1 |
| 5052 | P | .01 | 7.0 | 1 | 1 | 1 | 1 |
| 5052 | M | .01 | 7.0 | 1 | 1 | 1 | 1 |
| 3003 | P | .05 | 5.6 | 1 | 1-2 | 1-2 | 1-2 |
| 3003 | M | .05 | 5.6 | 1 | 1-2 | 1-2 | 1-2 |
| 5052 | P | .05 | 5.6 | 0-1 | 2 | 2 | 2 |
| 5052 | M | .05 | 5.6 | 0-1 | 2 | 2 | 2 |
| 3003 | P | .05 | 7.0 | 0-1 | 1 | 1 | 1 |
| 3003 | M | .05 | 7.0 | 1 | 1 | 1 | 1 |
| 5052 | P | .05 | 7.0 | 1 | 1 | 1 | 1 |
| 5052 | M | .05 | 7.0 | 1 | 1 | 1 | 1 |
| 3003 | P | .05 | 9.0 | 1-2 | 1-2 | 1-2 | 1-2 |
| 3003 | M | .05 | 9.0 | 1-2 | 1-2 | 1-2 | 1-2 |
| 5052 | P | .05 | 9.0 | 1-2 | 1-2 | 1-2 | 1-2 |
| 5052 | M | .05 | 9.0 | 1-2 | 1-2 | 1-2 | 1-2 |
| 3003 | M | 0.1 | 5.6 | 1-2 | 1-2 | 1-2 | 1-2 |
| 5052 | M | 0.1 | 5.6 | 1-2 | 1-2 | 1-2 | 1-2 |
| 3003 | M | 0.1 | 7.0 | 1 | 1 | 1 | 1 |
| 5052 | M | 0.1 | 7.0 | 1 | 1 | 1 | 1 |
| 3003 | M | 0.5 | 5.6 | 1 | 1 | 1 | 1-2 |
| 5052 | M | 0.5 | 5.6 | 1 | 1 | 1 | 1 |
| 3003 | M | 0.5 | 7.0 | 1 | 1 | 1 | 1 |
| 5052 | M | 0.5 | 7.0 | 1 | 1 | 1 | 1 |

No Visible Staining - 0
Mild Staining - 1
Severe Staining - 2
P — Polyvinyl Alcohol
M — Methylcellulose From the foregoing tests, it was observed that even though sodium molybdate was shown to delay the onset of water staining, it did so only by a matter of a few days. It also appeared to reduce the severity of water staining after the 10 to 20 day exposure times, but only to a minor degree. The use of sodium molybdate alone did not function as a satisfactory water staining inhibitor for aluminum base metals.

Sodium Molybdate in Conjunction with Sodium Nitrite

Under the identical conditions the previous tests experienced, a new test series was created to determine the effects of sodium nitrite (oxidizing agent) in combination with sodium molybdate (inhibitor). In order to determine whether observed effects of the combined chemicals were real or could be attributed merely to the presence of the additional oxidizing agent, a series of controls were used in all tests. The control in each case was a set of binder coated surfaces with the oxidizing agent present in the binder alone (in the same concentrations as that used in conjunction with the inhibitor).

Synergistic Effects of Sodium Molybdate and Sodium Nitrite

The effects of sodium molybdate in conjunction with sodium nitrite ($NaNO_2$) at the pH of distilled water (5.6) and neutral distilled water buffered with a phosphate were evaluated. Sodium nitrite concentrations of 0.0125, 0.025 and 0.5 mg/cm$^2$ were evaluated. Within the scope of these tests, the 0.025 mg/cm$^2$ showed the most favorable results. As in previous evaluations, only at a neutral pH was the staining of the aluminum surface preventable. At neutral pH and at a level of 0.025 mg/cm$^2$ nitrite and 0.05 mg/cm$^2$ sodium molybdate, all visible staining on the Al-Al interface and the Al-cardboard interface was eliminated for all exposure times.

As shown in Table V at a pH of 5.6, with 0.06 mg/cm$^2$ sodium nitrite and 0.05 mg/cm$^2$ sodium molybdate, the severity was reduced and water staining was delayed up to 10 days on the 3003 alloy. A sample was taken at 7.5 days for this test and no water staining was found, confirming that the first evidence of water staining was at 10 days. This can be attributed in part to the oxidizing effect of the sodium nitrite, but it is apparent that effect cannot overcome the pH effect on the aluminum oxide film stability. It cannot be, however, just the oxidizing impact of the sodium nitrite that is reducing the staining, for if that were the case, the more nitrite present, the more diminished would be the staining, and that is not the case.

For the range of pH's, and at the same level of sodium molybdate, staining on the aluminum surfaces was always less at a sodium nitrite level of 0.025 to 0.05 mg/cm$^2$. Therefore, the desired synergistic effect between sodium molybdate and sodium nitrite occurs at a neutral pH at a level of 0.025 mg/cm$^2$ sodium nitrite and 0.05 mg/cm$^2$ sodium molybdate and at levels of 0.05 mg/cm$^2$ sodium nitrite and 0.05 mg/cm$^2$ sodium molybdate.

The test results are illustrated in Table V.

TABLE V

Test Results with Sodium Molybdate and Sodium Nitrite in a Binder of Methylcellulose

| Alloy | Inhibitor mg/cm$^2$ | Oxidizer | Oxidizer mg/cm$^2$ | pH | Exposure Time, Days | | | |
|---|---|---|---|---|---|---|---|---|
| | | | | | .5 | 10 | 15 | 20 |
| 3003 | 0.05 | S.N. | .0125 | 5.6 | 1-2 | 2 | 2 | 2 |
| 5052 | 0.05 | " | .0125 | 5.6 | 1-2 | 1-2 | 2 | 2 |
| 3003 | 0.05 | " | .0125 | 7.0 | 0 | 0 | 0 | 1 |
| 5052 | 0.05 | " | .0125 | 7.0 | 0 | 0 | 0 | 1 |
| 3003 | 0.05 | S.N. | .025 | 5.6 | 1-2 | 1-2 | 2 | 2 |
| 5052 | 0.05 | " | .025 | 5.6 | 1-2 | 2 | 2 | 2 |
| 3003 | 0.05 | " | .025 | 7.0 | 0 | 0 | 0 | 0 |
| 5052 | 0.05 | " | .025 | 7.0 | 0 | 0 | 0 | 0 |
| 3003 | 0.05 | S.N. | .05 | 5.6 | 0 | 1 | 1 | 1 |
| 5052 | 0.05 | " | .05 | 5.6 | 1-2 | 2 | 2 | 2 |
| 3003 | 0.05 | " | .05 | 7.0 | 0 | 0 | 0 | 1 |
| 5052 | 0.05 | " | .05 | 7.0 | 0 | 0 | 0 | 0-1 |
| 3003 | — | S.N. | .025 | 5.6 | 1 | 1-2 | 1-2 | 2 |
| 5052 | — | " | .025 | 5.6 | 1 | 1-2 | 2 | 2 |
| 3003 | — | " | .025 | 7.0 | 1 | 1 | 1 | 1 |
| 5052 | — | " | .025 | 7.0 | 1 | 1 | 1 | 1 |
| 3003 | — | S.N. | .05 | 5.6 | 1 | 1 | 1-2 | 1-2 |
| 5052 | — | " | .05 | 5.6 | 1 | 1 | 1-2 | 1-2 |
| 3003 | — | " | .05 | 7.0 | 1 | 1 | 1 | 1 |
| 5052 | — | " | .05 | 7.0 | 1 | 1 | 1 | 1 |
| 3003 | — | S.N. | 0.5 | 5.6 | 1 | 1-2 | 1-2 | 1-2 |
| 5052 | — | " | 0.5 | 5.6 | 1 | 1-2 | 1-2 | 1-2 |
| 3003 | — | " | 0.5 | 7.0 | 1 | 1 | 1 | 1 |
| 5052 | — | " | 0.5 | 7.0 | 1 | 1 | 1 | 1 |

S.N. — Sodium Nitrite
No Visible Staining - 0
Mild Staining - 1
Severe Staining - 2

Based upon corrosion tests of 3003 and 5052 aluminum plate at 32 degrees Centigrade at 100 percent humidity for periods of 5, 10, 15 and 20 days, the following conclusions can be drawn:
1. Sodium molybdate alone cannot prevent water staining of aluminum at pH values of 5.6, 7.0 or 9.0.
2. Solutions of sodium molybdate and sodium nitrite can prevent or delay water staining of 3003 and 5052 aluminum depending upon the pH of the system. In systems which include a binder buffered to a pH of 7.0, sodium molybdate and sodium nitrite completely inhibit water staining for 20 days. In a system which includes an unbuffered binder at a natural occurring of pH of 5.6, water staining is delayed from 1 day in a control group without sodium nitrite or inhibitor to 10 days with the use of the inhibitor and sodium nitrite for the 3003 aluminum alloy.
3. It appears that the addition of sodium nitrite to the sodium molybdate systems serves to maintain the oxidation state of the molybdenum at a high enough value (+6) that it can co-precipitate with aluminum oxide on the protective oxide film and prevent further oxidation of the film.

In order to practice the instant invention, sodium molybdate and sodium nitrite can be solubilized in any convenient solvent which when applied effectively deposits these materials on the surface being treated. As noted herein, an organic binder, such as polyvinyl alcohol or methylcellulose, is preferred.

The resultant solution can then be applied to the surface being treated by any convenient means, such as brushing, spraying or dipping. All that is required is that an effective amount of sodium molybdate-sodium nitrite be deposited. This, obviously, can be determined empirically.

Again, the benefits of the instant invention are realized when an effective amount of sodium molybdate-sodium nitrite is applied to the surface of the aluminum base metal being treated. The exact amount utilized is not critical. Based on tests to date, excellent results are obtained when the sodium molybdate is deposited in the range of about 0.005 to about 0.05 mg/cm$^2$ and sodium nitrite in the range of about 0.0125 to about 0.5 mg/cm$^2$, with optimal results being achieved when the concentrate of sodium molybdate is about 0.55 mg/cm$^2$ and the concentration of sodium nitrite is 0.025 mg/cm$^2$.

While the preferred practice of the invention employs a sodium molybdate/sodium nitrite system, other water soluble alkali and alkaline earth molybdates, ammonium molybdate, and amine and alkanolamine molybdates can be utilized together with other alkali and alkaline earth nitrites, including ammonium nitrite, amine nitrite and alkanolamine nitrite.

Likewise, while the use of polyvinyl alcohol and hydroxypropyl methylcellulose as binders has been discussed herein, other water soluble agents which form flexible films on drying may be used. These include the alginates, gums, glycerol, and various forms of methyl and ethyl cellulose.

While there have been described what are at present considered to be the preferred embodiments of this invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:
1. A method of rendering an aluminum base metal surface resistant to water staining which comprises:
   a. providing an aluminum base metal surface; and
   b. applying a stain resistant coating to said aluminum base metal surface, said stain resistant coating consisting essentially a water soluble molybdate salt selected from the group consisting of alkali molybdate, alkaline earth molybdate, ammonium molybdate, amine molybdate and alkanolamine molybdate and a water soluble compound selected from the group consisting of alkali nitrite, alkaline earth nitrite, ammonium nitrite and alkanolamine nitrite in an amount sufficient to render said aluminum base metal surface resistant to water staining.

2. The method of claim 1 wherein said molybdate salt is sodium molybdate and said nitrite compound is sodium nitrite.

3. The method of claim 1 wherein in said stain resistant coating includes an organic binder.

4. The method of claim 3 wherein said organic binder is hydroxypropyl methylcellulose.

5. The method of claim 3 wherein said organic binder is polyvinyl alcohol.

6. The method of claim 2 wherein said coating is applied so that sodium molybdate is present on said coated surface in an amount ranging from about 0.005 to about 0.05 mg/cm$^2$.

7. The method of claim 6 wherein said coating is applied so that sodium molybdate is present on said coated surface in an amount of about 0.05 mg/cm$^2$.

8. The method of claim 2 wherein said coating is applied so that sodium nitrite is present on said coated surface in an amount ranging from about 0.0125 to about 0.5 mg/cm$^2$.

9. The method of claim 8 wherein said coating is applied so that sodium nitrite is present on said coated surface in an amount of about 0.025 mg/cm$^2$.

10. The method of claim 2 wherein said coating is applied so that sodium molybdate is present on said coated surface in an amount ranging from about 0.005 to about 0.05 mg/cm$^2$ and sodium nitrite is present on said coated surface in an amount ranging from about 0.0125 to about 0.5 mg/cm$^2$.

11. An article of manufacture comprising an aluminum base metal surface which is resistant to water staining having a coating thereon which consisting essentially of a water soluble molybdate salt selected from the group consisting of alkali molybdate, alkaline earth molybdate, ammonium molybdate, amine molybdate and alkanolamine molybdate and a water soluble nitrite compound selected from the group consisting of alkali nitrite, alkaline nitrite, ammonium nitrite and alkanolamine nitrite, in an amount sufficient to render said aluminum base metal surface resistant to water staining.

12. The article of claim 11 wherein said molybdate salt is sodium molybdate and said nitrite compound is sodium nitrite.

13. The article of claim 11 wherein said stain resistant coating includes an organic binder.

14. The article of claim 13 wherein said organic binder is hydroxypropyl methylcellulose.

15. The article of claim 13 wherein said organic binder is polyvinyl alcohol.

16. The article of claim 11 wherein sodium molybdate is present on said coated surface in an amount ranging from about 0.005 to about 0.05 mg/cm$^2$.

17. The article of claim 16 wherein sodium molybdate is present on said coated surface in an amount of about 0.05 mg/cm$^2$.

18. The article of claim 11 wherein sodium nitrite is present on said coated surface in an amount ranging from about 0.0125 to about 0.5 mg/cm$^2$.

19. The article of claim 18 wherein said sodium nitride is present on said coated surface in an amount of about 0.025 mg/cm$^2$.

20. The article of claim 11 wherein said sodium molybdate is present on said coated surface in an amount ranging from about 0.005 to about 0.05 mg/cm$^2$ and said sodium nitrite is present on said coated surface in an amount ranging from about 0.0125 to about 0.5 mg/cm$^2$.

21. The method of claim 1 wherein said stain resistant coating is applied to said aluminum metal base surface by contacting said aluminum metal base surface with a liner containing said stain resistant coating.

* * * * *